United States Patent [19]
Burgdorf et al.

[11] Patent Number: 4,552,253
[45] Date of Patent: Nov. 12, 1985

[54] FLOATING-CALIPER DISC BRAKE

[75] Inventors: Jochen Burgdorf, Offenbach-Rumpenheim; Roberto Stoka, Nauheim, both of Fed. Rep. of Germany

[73] Assignee: ITT Industries, Inc., New York, N.Y.

[21] Appl. No.: 500,064

[22] Filed: Jun. 1, 1983

[30] Foreign Application Priority Data

Jun. 24, 1982 [DE] Fed. Rep. of Germany ....... 3223627

[51] Int. Cl.$^4$ .............................................. F16D 65/00
[52] U.S. Cl. ............................. 188/73.38; 188/73.45; 192/30 V
[58] Field of Search ............... 188/73.35, 73.38, 73.37, 188/73.43, 73.45, 73.36, 205 A, 73.44, 73.32, 73.33; 267/53, 158; 192/30 V, 70.19

[56] References Cited

U.S. PATENT DOCUMENTS

| 3,388,774 | 6/1968 | Burnett | 188/73.45 X |
| 3,734,248 | 5/1973 | Fay | 188/73.45 X |
| 3,841,445 | 10/1974 | Rinker | 188/73.43 X |
| 4,034,857 | 7/1977 | Kondo et al. | 188/73.45 X |
| 4,046,231 | 9/1977 | Ohori et al. | 188/73.45 X |
| 4,074,795 | 2/1978 | Kondo et al. | 188/73.45 X |
| 4,330,049 | 5/1982 | Cybulski et al. | 188/73.36 |
| 4,360,079 | 11/1982 | Belart | 188/73.43 X |
| 4,369,862 | 1/1983 | Seki | 188/73.45 |

FOREIGN PATENT DOCUMENTS

| 2538565 | 3/1976 | Fed. Rep. of Germany . |
| 2919538 | 2/1980 | Fed. Rep. of Germany . |
| 2950232 | 6/1980 | Fed. Rep. of Germany . |

Primary Examiner—Bruce H. Stoner, Jr.
Assistant Examiner—Robert J. Oberleitner
Attorney, Agent, or Firm—James B. Raden

[57] ABSTRACT

In a fist-type caliper disc brake, there is provided at least one angular retaining spring which is secured to the brake support member. One of its legs is fastened to a radial surface (17) of the brake support member, while its other leg (11b) urges the fist-type caliper radially against a supporting surface on the brake support member.

7 Claims, 6 Drawing Figures

FLOATING-CALIPER DISC BRAKE

BACKGROUND OF THE INVENTION

The present invention relates to a floating-caliper disc brake, in particular a fist-type caliper disc brake, wherein the floating caliper is axially slidably guided by axial guide bolts which are screwed into the brake support member laterally of the hydraulic cylinder, at least one guide bolt being encompassed by an elastic sleeve, and by supporting surfaces of the brake support member which are effective radially inwardly as well as in a circumferential direction.

In a known fist-type caliper disc brake (German Patent DE-OS No. 2,919,538), a clamping spring is used to avoid rattling of the brake shoes which is of complicated construction and not easy to assemble.

Since the floating caliper, in particular a fist-type caliper, is supported elastically at the brake support member via the elastic sleeve or the elastic sleeves, there may occur movements of the caliper in all directions during braking and due to vibrations. To prevent this, there is provided supporting surfaces in the caliper and in the brake support member and the steering knuckle, respectively, which define the position of the caliper. The floating caliper is prevented from moving in a tangential direction by being arranged in an aperture of the brake support member.

SUMMARY OF THE INVENTION

It is an object of the present invention to improve upon a floating-caliper disc brake of the type referred to hereinabove to the end that the mounting support in a radially inward direction is ensured by simple means.

A feature of the present invention is the provision of a floating-caliper disc brake comprising: a floating-caliper axially slidably guided by a pair of spaced axial guide bolts screwed into a brake support member and by supporting surfaces in the support member; and at least one angular retaining spring having one leg thereof extending radially outward held against the support member and another leg thereof extending axially exerting a radially inward force on the caliper to retain the caliper against the supporting surfaces, the other leg being in slide-frictional engagement with the caliper to enable the caliper to slide axially relative to the spring.

Thus, according to the present invention, a very simple component, namely, a bent spring is used to radially hold down the floating caliper. In general, such an angular retaining spring will be employed at each of the two axial guide bolts. In a first favorable embodiment, the one flat leg of the sheet-metal angular retaining spring is fastened to a surface disposed in a radial plane, and the spring is located directly beside one of the axial guide bolts.

Preferably, the one flat leg is fastened detachably to the brake support member so that it can be easily mounted during the assembly. This detachable fastening may for instance, include the one flat leg containing a catching aperture cooperating with a rivet.

In another embodiment, the axial guide bolt will be used for the fastening of the angular retaining spring. In a suitable manner, the angular retaining spring has its one leg fastened to the brake support member by means of the associated axial guide bolt.

Expediently, the one leg is urged against the brake support member by a guide bushing which is penetrated and axially held by the associated axial guide bolt. In the event of an axial guide bolt encompassed by an axial sleeve, there is in general provided between the bolt and the sleeve a like guide bushing provided according to the present invention as retaining means and fastening means, respectively, for the angular retaining spring. Suitably, the guide bushing and the angular retaining spring form a constructional unit which facilitates the assembly.

This embodiment affords particular ease of assembly because, due to the elastic sleeve around the guide bushing, the angular retaining spring may first assume a somewhat inclined position when bolted and, consequently, does not yet exert any substantial radial spring force on the floating caliper. When tightening the bolt, the guide sleeve or the angular retaining spring will move into abutment on the flat or plane mating surface of the brake support member. As a result, the angular retaining spring will assume its final position and bias itself in the required fashion.

According to a first practical embodiment, the angular retaining spring can be a wire spring whose one leg is bent to form a lug enclosing the axial guide bolt and the guide bushing.

The angular retaining spring may also be constructed as a sheet-metal part whch is secured to the guide bushing, in particular, welded or riveted thereto.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
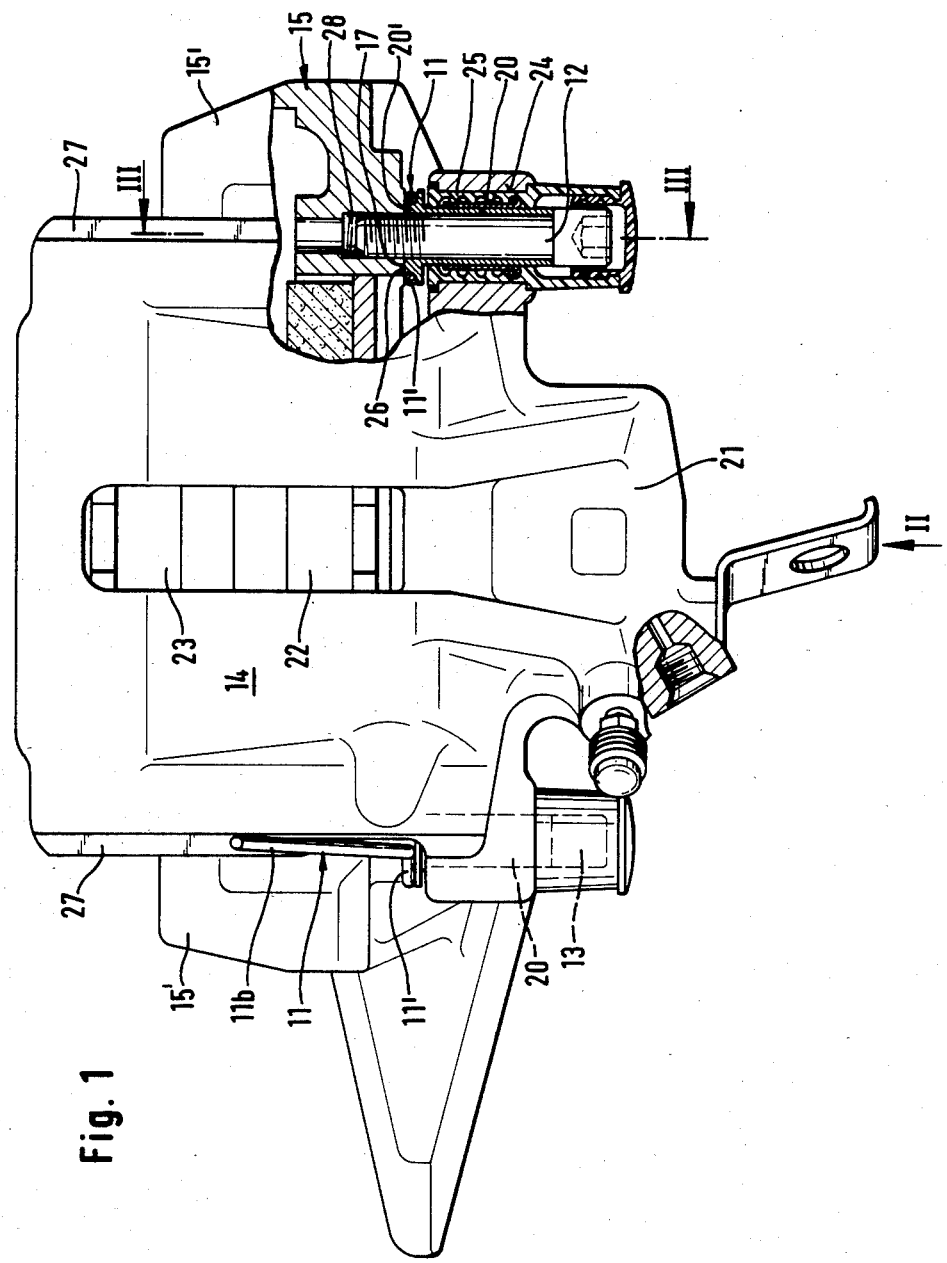
FIG. 1 is a partial cross-sectional view taken in the direction of the wheel axle of a disc brake in accordance with the principles of the present invention.
Figure 2:
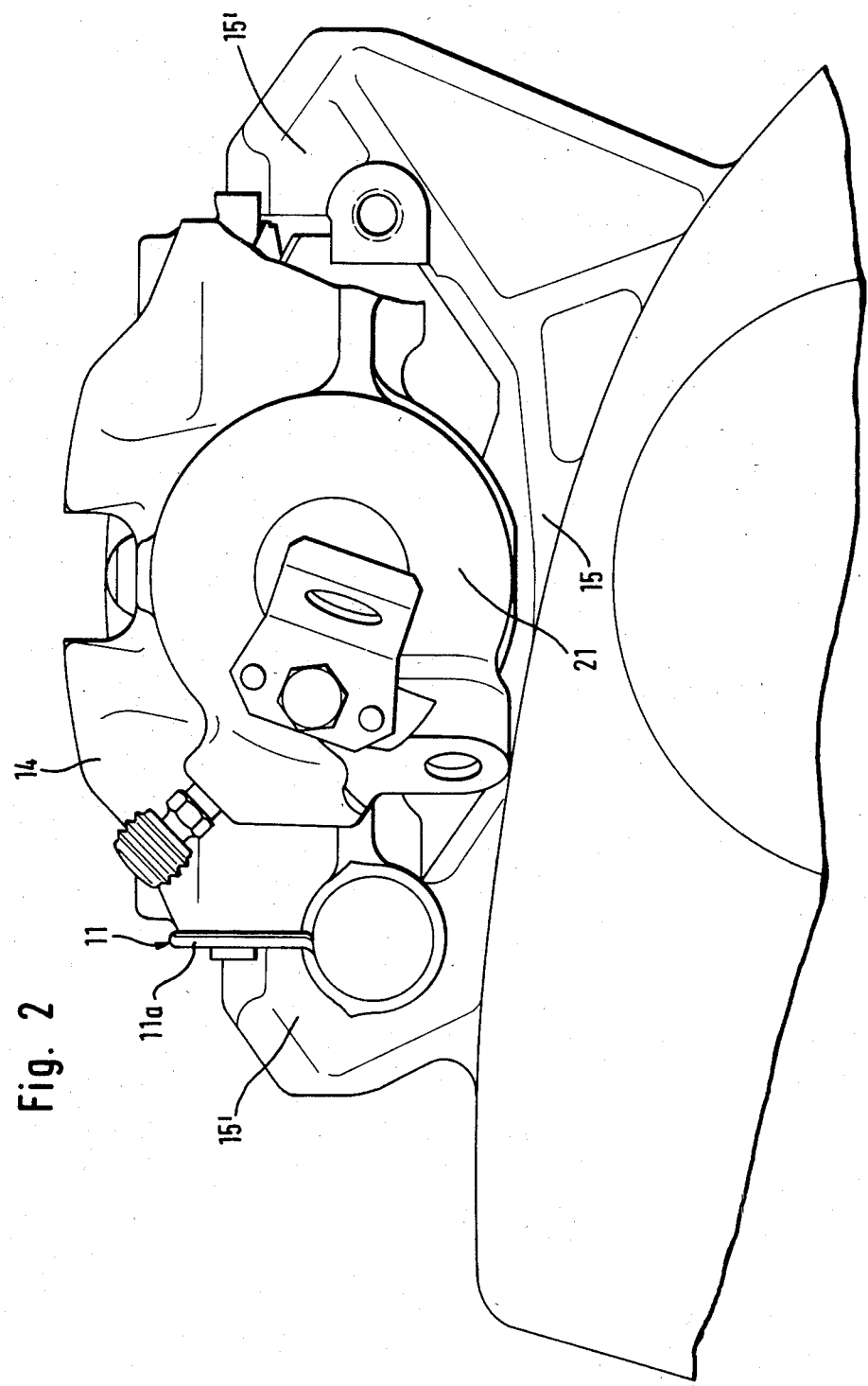
FIG. 2 is a view of the disc brake of FIG. 1 taken in the direction of the arrow II in FIG. 1.
Figure 3:
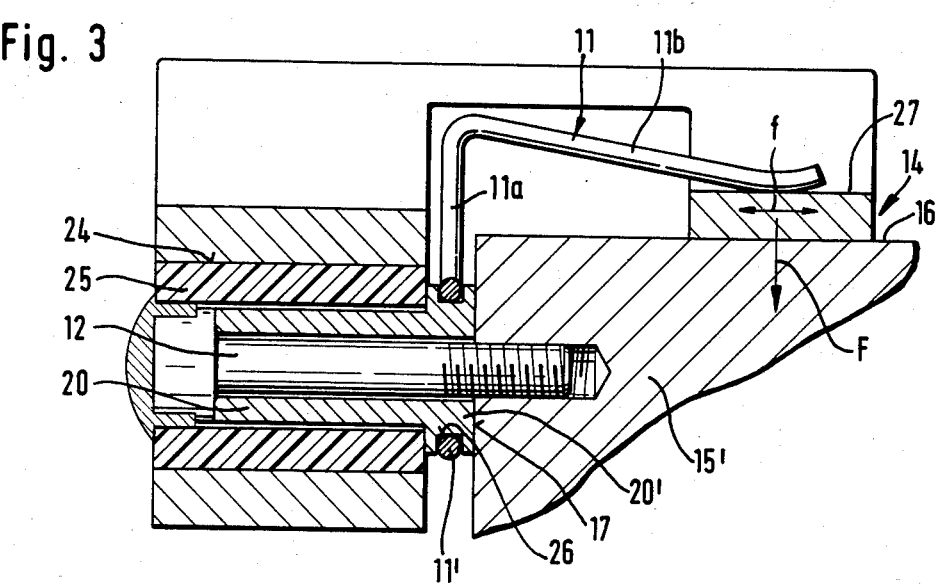
FIG. 3 is a schematic, somewhat enlarged cross-sectional view taken along line III—III of FIG. 1.

According to FIGS. 1 through 3, the inventive fist-type caliper brake comprises a brake support member 15 with two circumferentially spaced, radially extending retaining arms 15' between each of which a fist-type caliper 14 is arranged. Fist-type caliper 14 carries on the inner wheel side the hydraulic cylinder 21 as well as the brake shoes 22 and 23, between which the non-illustrated brake disc is located.

On the inner wheel side, fist-type caliper 14 contains beside the hydraulic cylinder 21 lateral axial guide bores 24, the right hand one thereof, when viewing FIG. 1, carrying an elastic sleeve 25 internally thereof. A rigid guide bushing 20 made from metal extends axially through bores 24 and the elastic sleeve 25, respectively. Seated in turn in guide bushing 20 is an axial guide bolt 12 and 13, respectively, each of which is screwed into the associated retaining arm 15' of brake support member 15, while the guide bushing 20 is axially clamped.

Accordingly to FIGS. 1 through 3, an inventive angular retaining wire spring 11 is secured to the flange 20' of the guide bushing 20, which flange is adjacent to the brake support member 15. This is accomplished by one leg 11a being bent to form a circular lug 11' which is seated in an annular groove or an annular recess 26 of flange 20'. Preferably, the angular retaining spring 11 is preassembled with the guide bushing 20 as a constructional unit from the very start.

The second leg 11b of the angular retaining spring 11 extends according to FIGS. 1 and 3 axially in the direction of the brake disc (not shown) and abuts on top of a spring abutment surface 27 in fist-type caliper 14. In the position best seen in FIG. 3, the angular retaining spring 11 is biased such that it is able to exert a radial retaining force on the spring abutment surface 27 in the direction of the arrow F. By this arrangement, fist-type caliper 14 will be urged against a supporting surface 16 of retaining arm 15' which extends in an axial direction. Thus, caliper 14 will be able, during braking, to slide to and fro relative to the supporting surface 16 in the direction of the double arrow f in FIG. 3. In this arrangement, spring abutment surface 27 also slides relative to the angular retaining spring 11 fastened to the brake support member 15.

The assembly of the inventive angular retaining spring 11 is particularly favorable.

When screwing the axial guide bolts 12 and 13 into the assigned threaded bore 28 (FIG. 1), the leg 11b of the angular retaining spring 11 will abut on the spring abutment surface 27 from above. However, because of the elastic sleeve 25, first the entire guide bushing 20 will assume a somewhat inclined position within the axial guide bores 24 so that the angular retaining spring does not yet exert the entire radial retaining force F on the fist-type caliper 14. Only when the axial bolts 12 and 13 are tightened will flange 20' move into abutment on the plane mating surface 17 of brake support member 15, and the guide bushing 20 will now adjust itself vertically to this surface 17. To this end, the angular retaining spring 11 will be bent upwards somewhat elastically and thereby will be biased so as to now be able to exert the desired radial retaining force F on fist-type caliper 14.

Figure 6:
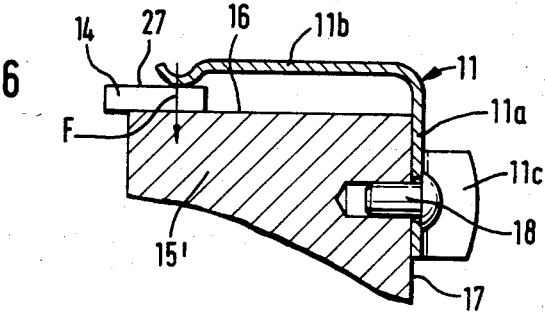
FIG. 6 is a schematic enlarged cross-sectional view taken along line IV—IV in FIG. 4.
Figure 5:
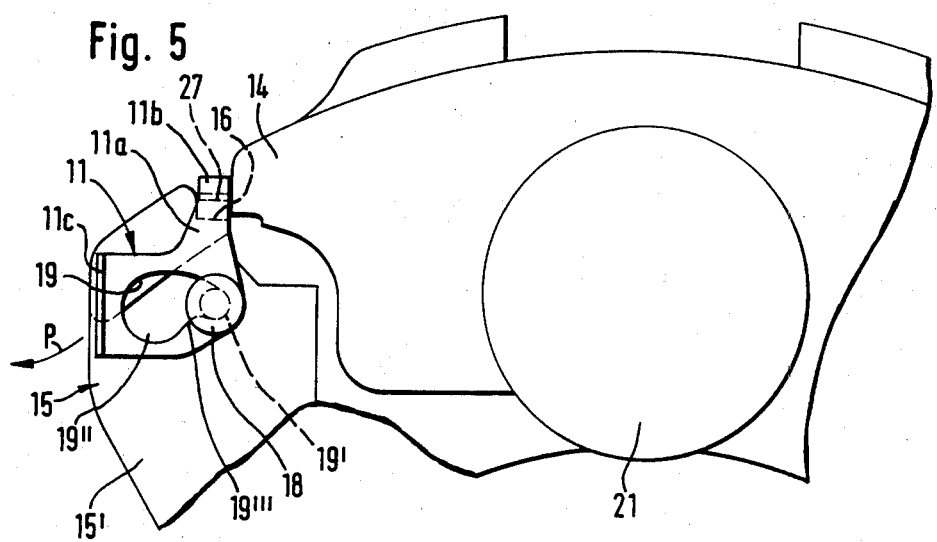
FIG. 5 is a view of the disc brake of FIG. 4 analogous to the view shown in FIG. 2.
Figure 4:
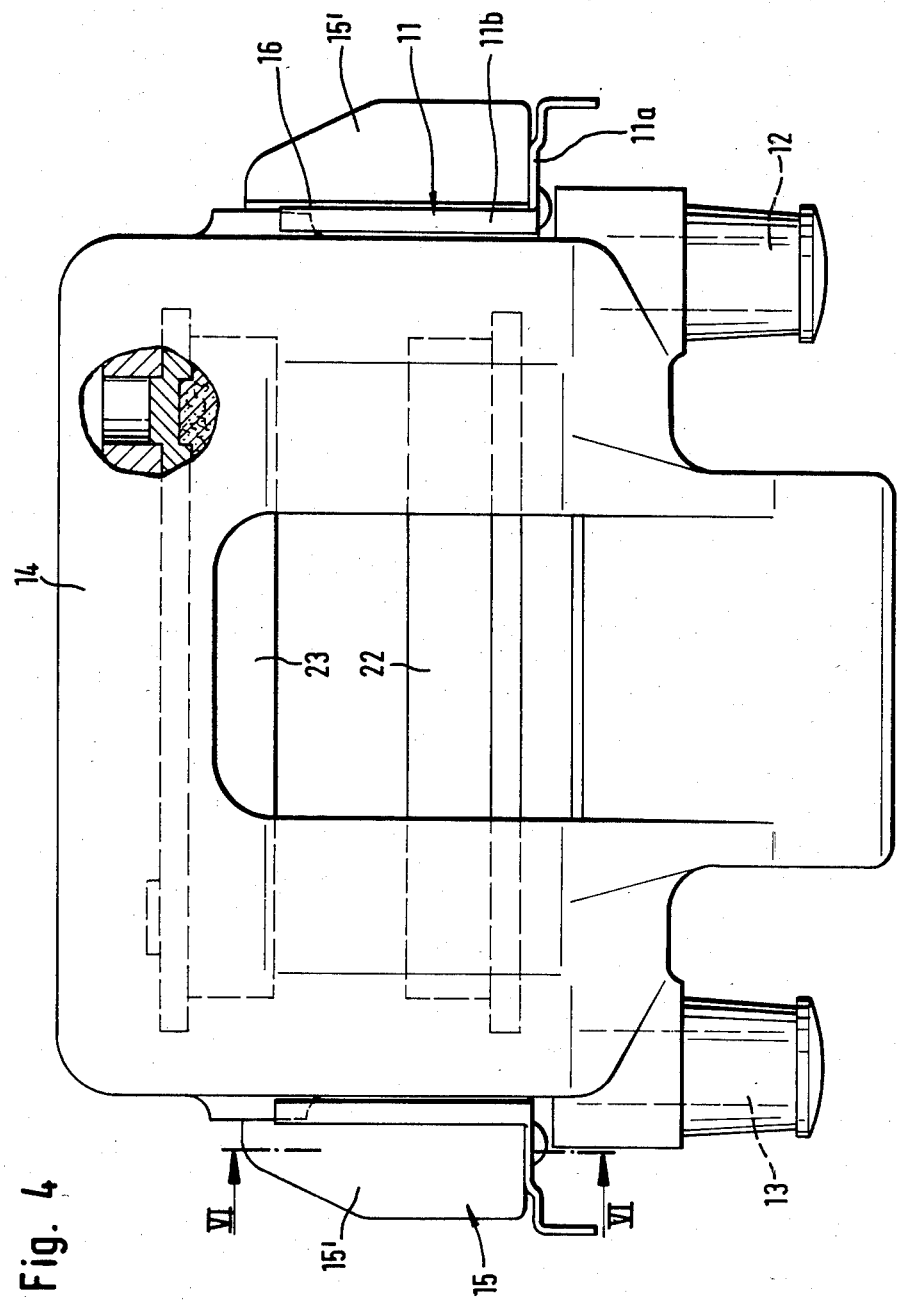
FIG. 4 is a partial cross-secttional view taken in the direction of the wheel axle of another embodiment of a disc brake in accordance with the present invention.

In the embodiment according to FIGS. 4 through 6, fist-type caliper 14 is analogous to the preceding embodiment axially slidably supported on the retaining arms 15' of brake support member 15 by means of the axial guide bolts 12 and 13. Parts that correspond to those in FIGS. 1 through 3 have been assigned like reference numeral. In the embodiment of FIGS. 4 through 6, however, the angular retaining spring 11 is not held by one of the axial guide bolts 12 and 13, but rather by a separate rivet 18, on the radial surface 17 of the associated retaining arm 15' of brake support member 15.

To achieve this, the rivet 18 projects from the surface 17 by the thickness of the sheet metal from which angular retaining spring 11 (FIG. 6) is made. The leg 11a of angular sheet metal retaining spring 11 abuts on surface 17 and contains the catching aperture 19 best seen in FIG. 5. Catching aperture 19 includes a small portion 19' extending behind the rivet head and encompassing the rivet 18 and an enlarged portion 19" which is enlarged such that it fits over the head of the rivet 18. Disposed between the two aperture portions 19' and 19" on the side remote from the other leg 11b of spring 11 is a small catching projection 19'" past which spring 11 can be brought in catching engagement with rivet 18. A tab 11c of angular retaining spring 11 perpendicular to leg 11a serves for easy handling.

The assembly of the angular retaining spring 11 according to FIGS. 4 through 6 will be effected as follows. First of all, spring 11 will be slid in a somewhat tilted form with its aperture portion 19" over the head of the rivet 18. In doing so, the leg 11b is already placed on spring abutment surface 27 of fist-type caliper 14. Leg 11a will now be moved to the left in the direction of the arrow P in FIG. 5 by means of tab 11c serving as a handle, and leg 11a will be drawn in radially inwardly until rivet 18 catches aperture portion 19'. in this arrangement, retaining spring 11 will be biased such that it is again able to exert the radial retaining force F (FIG. 6) on spring abutment surface 27. Thus, fist-type caliper 14 will be reliably pressed against supporting surface 16 of retaining arm 15' of brake support member 15.

It has to be pointed out that in the embodiment of FIGS. 1 through 3, angular retaining spring 11 can be fastened in guide bushing 20 by being riveted, glued or welded thereto. It is important that in this embodiment there is no need to machine brake support member 15 and retaining arm 15' for angular retaining spring 11. Spring abutment surface 27 does not necessitate any machining either.

In the embodiment according to FIGS. 4 through 6, one bore and one rivet to be inserted into the bore will be required per spring.

While we have described above the principles of our invention in connection with specific apparatus it is to be clearly understood that this description is made only by way of example and not as a limitation to the scope of our invention as set forth in the objects thereof and in the accompanying claims.

We claim:

1. A floating caliper disc brake mechanism comprising a pair of disc brake shoes adapted to be mounted adjacent opposed axial faces of a wheel brake disc, a caliper assembly mounted for floating movement in a direction axial to a support member to control movement of the brake shoes relative to said brake disc, a pair of spaced guide bolts mounting said caliper assembly to said brake support member to enable movement of said caliper assembly in a direction axial to the support member with the axis of said bolts generally parallel to the axis of said support member and disc a guide bushing surrounding each guide bolt, at least one generally L-shaped retaining spring having a retaining leg thereof having a section forming a lug surrounding said guide bushing to mount the spring thereto and another section extending in a direction radial to an adjacent one of said bolts for firmly positioning said spring against a surface of said support member transverse to the axis of movement of the caliper assembly, another leg of said retaining spring extending parallel to the axis of movement of said caliper assembly and exerting a force transversely on the caliper assembly to retain said caliper assembly against said support member in a slide frictional engagement therewith to enable the axial slide movement of the caliper assembly relative to said support member and to the other leg of the spring.

2. A disc brake according to claim 1, wherein said one leg is made from spring sheet metal and is fastened relative to a given surface of said support member disposed perpendicular to said supporting surfaces.

3. A disc brake according to claim 2, wherein said one leg is detachably fastened relative to said given surface.

4. A disc brake according to claim 3, wherein
said one leg includes a catching aperture cooperating with a rivet secured in said given surface.

5. A disc brake according to claim 1, wherein
said one leg is held against said support member by means of the associated one of said pair of guide bolts.

6. A floating-caliper disc brake comprising:
a floating-caliper carrying a hydraulic cylinder for actuating said brake, said caliper being slidably guided in an axial direction by a pair of spaced guide bolts screwed into a brake support member and also by axially elongated supporting surfaces of said support member; and a guide bushing surrounding each guide bolt,
a pair of angular retaining springs, each of said springs having one leg thereof having one section forming a lug surrounding said guide bushing to mount the spring thereto and another section extending radially outwardly of said cylinder on said support member against said support member and having another leg thereof extending generally axially of the cylinder to exert an inward force on said caliper to retain said caliper against said supporting surfaces, said other leg of each spring being in slide-frictional engagement with said caliper to enable said caliper to slide axially relative to said cylinder along said supporting surfaces.

7. A floating caliper disc brake as claimed in claim 6, in which said spring is configured of a length of wire.

* * * * *